(12) United States Patent
    Knott et al.

(10) Patent No.: US 12,580,745 B2
(45) Date of Patent: Mar. 17, 2026

(54) METHOD AND SYSTEM FOR BINDING A USER ACCOUNT TO A DIGITAL VEHICLE KEY

(71) Applicant: Bayerische Motoren Werke Aktiengesellschaft, Munich (DE)

(72) Inventors: Thorsten Knott, Tuntenhausen (DE); Olaf Mueller, Emmering (DE); Stefan Diewald, Moosburg a. d. Isar (DE); Sven Hofmann, Munich (DE); Christoph Schaefer, Germering (DE); Dominik Schwald, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 15 days.

(21) Appl. No.: 18/730,151

(22) PCT Filed: Sep. 28, 2022

(86) PCT No.: PCT/EP2022/076922
    § 371 (c)(1),
    (2) Date: Jul. 18, 2024

(87) PCT Pub. No.: WO2023/174568
    PCT Pub. Date: Sep. 21, 2023

(65) Prior Publication Data
    US 2025/0141664 A1      May 1, 2025

(30) Foreign Application Priority Data
    Mar. 18, 2022    (EP) ..................................... 22163021

(51) Int. Cl.
    *H04L 29/06*        (2006.01)
    *B60K 35/21*        (2024.01)
            (Continued)

(52) U.S. Cl.
    CPC ............ *H04L 9/0825* (2013.01); *B60K 35/21* (2024.01); *H04L 9/0877* (2013.01); *H04L 9/3247* (2013.01)

(58) Field of Classification Search
    None
    See application file for complete search history.

(56) References Cited

U.S. PATENT DOCUMENTS

2020/0029213 A1     1/2020   Nolscher et al.
2020/0120500 A1     4/2020   Sharma et al.

FOREIGN PATENT DOCUMENTS

WO      WO-2013058781 A1 *   4/2013   ............. G06F 21/41
WO      WO-2019069129 A1 *   4/2019   ............ H04W 12/06

OTHER PUBLICATIONS

"BLE Vehicle Personalization ED—Darl Kuhn", IP.com, IP.com Inc., West Henrietta, NY, US, Mar. 5, 2021 (Mar. 5, 2021), XP013189128, (12 Pages) (Year: 2021).*

(Continued)

*Primary Examiner* — Andrew J Steinle
(74) *Attorney, Agent, or Firm* — Maginot, Moore & Beck LLP

(57)                ABSTRACT

A method and system for a vehicle for binding a user account with a digital key is disclosed herein. The method includes receiving information about an account binding of a user from an administrative platform for the vehicle, the information about the account binding comprising information on a digital account key. The method also includes receiving access information from a user, the access information comprising information on a digital user key, and verifying that the digital account key and the digital user key match to obtain user grant information. The method further includes obtaining information about one or more personalized settings or services of the user for the vehicle based (Continued)

10

11 logging into the user account of an administrative platform for vehicles

12 receiving information on the digital key stored on the smart device

13 informing an application for processing vehicle information about the information on the digital key

14 generating a user account attestation comprising a signature based on the digital key

15 forwarding the user account attestation to the administrative platform for binding the user account with the digital key on the user grant information, and applying the one or more settings to the vehicle or enabling the one or more services for the user in the vehicle.

20 Claims, 5 Drawing Sheets

(51) Int. Cl.
    *H04L 9/08*          (2006.01)
    *H04L 9/32*          (2006.01)

(56)             References Cited

OTHER PUBLICATIONS

International Search Report corresponding to International Patent Application No. PCT/EP2022/076922, dated Feb. 3, 2023 (3 pages).
Extended European Search Report corresponding to European Patent Application No. EP22163021.3, dated Sep. 13, 2022 (10 pages).
"BLE Vehicle Personalization ED—Darl Kuhn", IP.com, IP.com Inc., West Henrietta, NY, US, Mar. 5, 2021 (Mar. 5, 2021), XP013189128, (12 Pages).

* cited by examiner

20

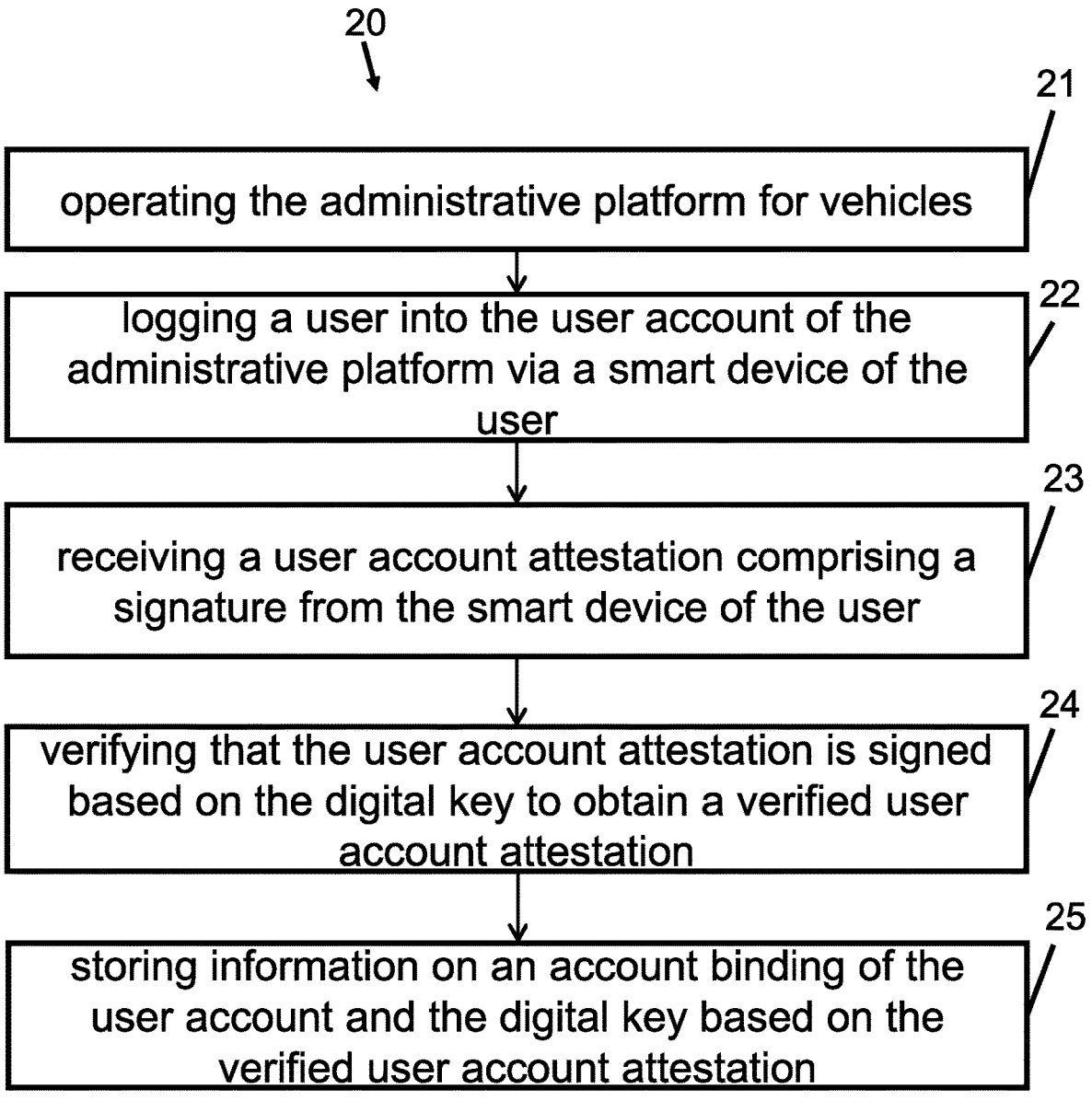

21 operating the administrative platform for vehicles

22 logging a user into the user account of the administrative platform via a smart device of the user

23 receiving a user account attestation comprising a signature from the smart device of the user

24 verifying that the user account attestation is signed based on the digital key to obtain a verified user account attestation

25 storing information on an account binding of the user account and the digital key based on the verified user account attestation

Fig. 2

METHOD AND SYSTEM FOR BINDING A USER ACCOUNT TO A DIGITAL VEHICLE KEY

CROSS-REFERENCE TO RELATED APPLICATIONS

The present application is the U.S. national phase of PCT Application PCT/EP2022/076922 filed on Sep. 28, 2022, which claims priority to European patent application No. EP22163021.3 filed on Mar. 18, 2022, the entire contents of which are incorporated herein by reference

FIELD

The present disclosure relates to the field of digital access and configuration of vehicles. More specifically, the present disclosure relates to methods, computer programs, and apparatuses for a smart device, an administrative platform for vehicles, and a vehicle, and for binding a user account to a digital key, more particularly, but not exclusively, to a concept for binding a digital key of a vehicle to a user account, for example, to enable user specific pre-configuration of the vehicle.

BACKGROUND

Solutions for digital car keys are currently defined by the Car Connectivity Consortium's (CCC) standard release 3 (Car Connectivity Consortium Digital Key Release 3 Version 1.0.0 (CCC-TS-101)). The CCC is a cross-industry organization advancing global technologies for smartphone-to-car connectivity solutions. CCC is developing Digital Key, an open standard to allow smart devices, like smartphones to act as a vehicle key. Digital Key will let drivers lock and unlock their cars and let them start the engine and share access to friends or valets, using their phones. Another project, Car Data, will create an ecosystem to link the ever-expanding set of vehicle data to authorized data usage, such as pay-how-you-drive insurance, road monitoring, and fleet management. CCC previously developed and launched MirrorLink, an open standard for connecting apps between the smartphone and the car. MirrorLink is currently used in many cars and smartphones. CCC includes a large number of stakeholders, including car OEMs (Original Equipment Manufacturers), tier-I suppliers, phone manufacturers, and app developers.

For example, an access system is standardized consisting of a) smart devices and software that i) carry a digital key embedded in secure storage on the smart device, ii) offer interfaces from the secure storage to the smartphone operating system, and iii) offer interfaces from the smartphone operating system to other applications running on the smartphone (e.g. a vehicle OEM's app); b) a vehicle, allowing carriers of a digital key to operate certain vehicle functionality; and c) backend systems, interconnecting smart devices and vehicles allowing to share and manage digital keys and offer additional services.

Vehicle OEMs may offer services and settings (seat position, audio settings, available services and other preferences, etc.) associated with a specific user and technically bound to a "user account" with that vehicle OEM (e.g. connected drive account, user account on an administrative platform for vehicles and/or fleet management). This vehicle OEM user account may be used to transfer services and settings from one vehicle to another by logging into that account in a vehicle of that vehicle's OEM (mapping of an account to the specific vehicle). Vehicle OEM user accounts can be bound to digital keys, by explicitly linking account and key inside the vehicle through the HMI (Human Machine Interface, e.g. a touchscreen or display inside the vehicle).

For example, in conventional systems a sharing feature of the digital car key solution is independent of vehicle OEM applications on the smart device. In particular, it may be offered to users through applications running natively on the smartphone (e.g. wallet or secure applications). The identity of a smart device receiving a digital key is anonymized towards the vehicle OEM on the backend interfaces. Moreover, vehicle OEM user accounts can be bound to digital keys by explicitly linking account and key inside the vehicle through the HMI. The vehicle OEM application on the smart device may have access to digital keys installed on the smart device if the app is currently used by the user of the smart device.

In view of the foregoing, it will be recognized that there may be a demand for an improved concept for binding a user account with a digital key.

SUMMARY

Embodiments disclosed herein are based on the finding that manually and explicitly linking digital keys to vehicle OEM user accounts is tedious for the user and requires use of the car before associating the digital key with a user account. Additionally, logging into a user account in the car needs to be protected to ensure privacy and security of sensitive user data. It is a finding that a digital key can be securely bound to a user account if the smart device, on which a digital key is stored, generates a user account attestation, which can be verified. Such verification can be enabled by generating a signature, which is based on the digital key on the smart device. On the network side, e.g. an application on an administrative platform for the vehicle, the signature can be verified and therewith embodiments may establish the binding between the digital key and the user account. Subsequently the user specific information may be communicated to the vehicle associated with the digital key.

Embodiments provide a method for a smart device of a user and for binding a user account with a digital key. The method comprises logging into the user account of an administrative platform for vehicles and receiving information on the digital key stored on the smart device. The method further comprises informing an application for processing vehicle information about the information on the digital key and generating a user account attestation comprising a signature based on the digital key. The method further comprises forwarding the user account attestation to the administrative platform for binding the user account with the digital key. Therewith, a binding of the user account and the digital key may be achieved in embodiments without any interaction between a user and the vehicle.

In further embodiments, the digital key is stored using a secure application of the smart device. Embodiments may enable storage of a digital key for a vehicle in a secure application of the smart device independent of any further application for processing vehicle information, e.g. an application of an OEM of the vehicle.

In some embodiments the method may further comprise granting access to the digital key stored by the secure application to the application for processing vehicle information. That way, access right administration or management can be efficiently enabled, e.g., by authorizing a restricted set of applications or a single application for access of the digital key. Such rights management can be based on rights information associated with the digital key, rights information associated with an accessing application, or both.

Embodiments further provide a method for an administrative platform for vehicles and for binding a user account with a digital key. The method comprises operating the administrative platform for vehicles and logging a user into the user account of the administrative platform via a smart device of the user. The method further comprises receiving a user account attestation comprising a signature from the smart device of the user and verifying that the user account attestation is signed based on the digital key to obtain a verified user account attestation. The method further comprises storing information on an account binding of the user account and the digital key based on the verified user account attestation. Therewith, a digital key of a vehicle can be bound to a user account without any need for the user to interact with the actual vehicle.

In some embodiments the method further comprises using a private key of a pair of the private key and a public key as the digital key. Therewith any according key pair can be pre-determined, e.g. a key pair can be generated during manufacturing of a vehicle or when a vehicle changes owners/is sold. For example, a cross-signed trust base is used in a certificate chain. The vehicle gets its certificate from the backend. This is reissued with each change of ownership, which corresponds to a mapping of the vehicle to a different account. The private key for the respective digital key can be generated dynamically during the so-called owner pairing in a secure element (chip that is by design protected from unauthorized access configured for security tasks), which is trusted by the certificate chain. The associated public key is securely transmitted to the vehicle and backend and can then be used to verify a signature. For example, the verifying is based on the public key. Therewith an efficient means for verifying the user account attestation can be provided by embodiments.

In further embodiments the method may comprise transmitting the information on the account binding to a vehicle associated with the digital key. Therewith the vehicle can also be informed about the binding of the account. For example, a user may be able to open the vehicle using the smart device without having to interact with the vehicle, e.g. because a friend-key, which he received from an owner of the vehicle, has been bound to his user account and the vehicle has been informed.

Moreover, in some embodiments the method may further comprise transmitting information on personalized user settings and/or services for the user to the vehicle. That way, a user may be welcomed by a vehicle with his preferred setting or configuration already in place (e.g. already at the first approach with a newly received digital key).

Embodiments further provide a method for a vehicle and for binding a user account with a digital key. The method comprises receiving information about an account binding of a user from an administrative platform for the vehicle, the information about the account binding comprising information on a digital account key. The method further comprises receiving access information from a user, the access information comprising information on a digital user key. The method further comprises verifying that the digital account key and the digital user key match to obtain user grant information. The method further comprises obtaining information about one or more personalized settings and/or services of the user for the vehicle based on the user grant information and applying the one or more settings to the vehicle and/or enabling the one or more services for the user in the vehicle. Therewith a user may be provided with his personal settings or personalized services upon initial access of the vehicle.

Furthermore, the method for the vehicle may further comprise granting access to the vehicle for the user based on the grant information. Hence, at least in some embodiments the user may be enabled to access the vehicle based on the digital key even if the user has not accessed the vehicle before.

A further embodiment is a computer program having a program code for performing any of the methods described herein, when the computer program is executed on a computer, a processor, or a programmable hardware component. Yet another embodiment is an apparatus for a smart device comprising a control unit for performing any one of the methods for the smart device. A further embodiment is an apparatus for an administrative application for vehicles comprising a control unit for performing any one of the methods for the administrative platform for vehicles. An apparatus for a vehicle comprising a control unit for performing any one of the methods for a vehicle is another embodiment. A vehicle comprising such an apparatus is yet another embodiment.

BRIEF DESCRIPTION OF THE DRAWINGS

Some examples of apparatuses, methods and/or computer programs will be described in the following by way of example only, and with reference to the accompanying figures, in which

FIG. 2 shows a block diagram of a method for an administrative platform for vehicles and for binding a user account with a digital key;

DESCRIPTION

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed, or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures. As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes", or "including", when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
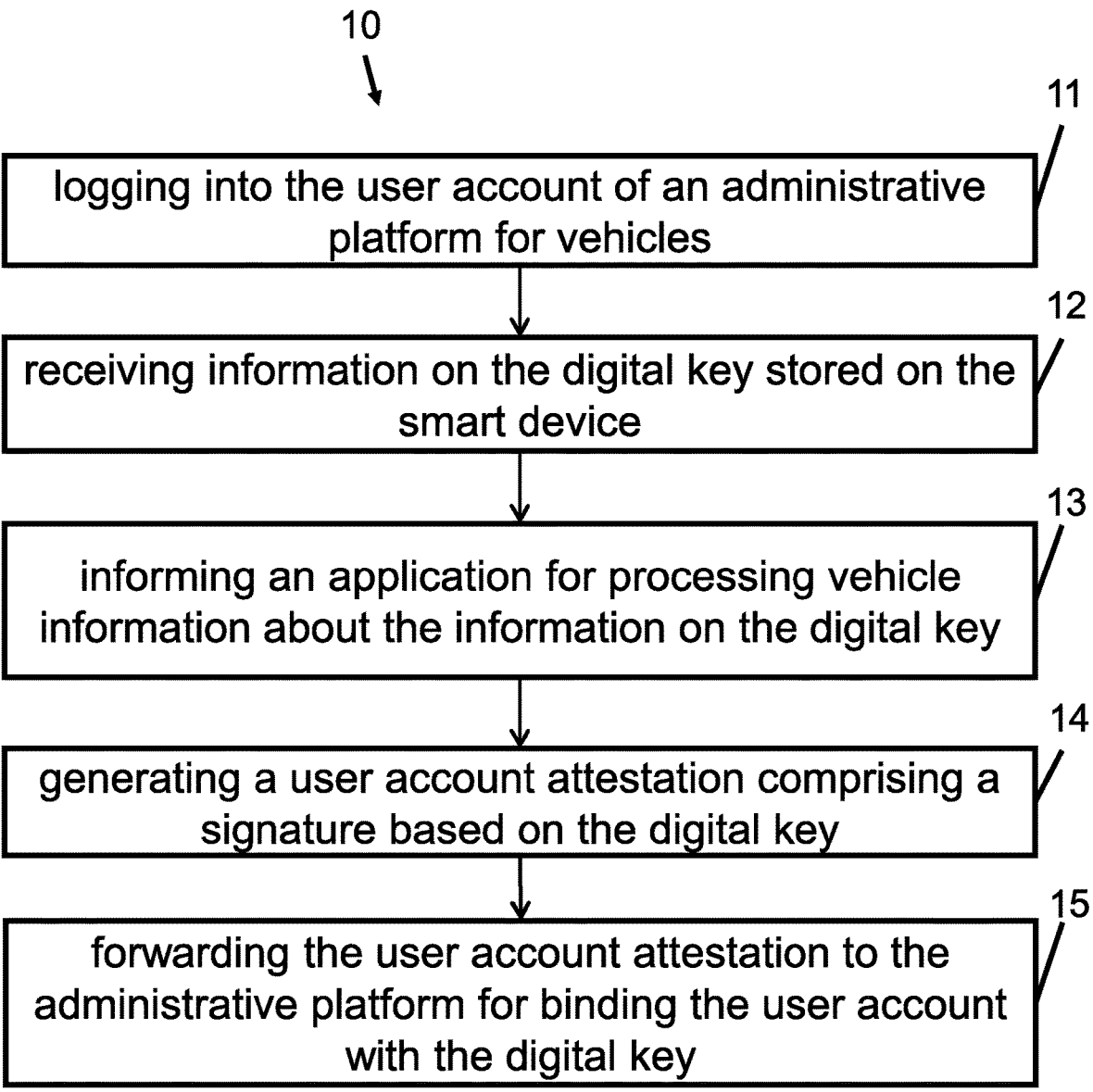
FIG. 1 shows a block diagram of a method for a smart device of a user and for binding a user account with a digital key.

FIG. 1 shows a block diagram of a method 10 for a smart device of a user and for binding a user account with a digital key. For example, the smart device may correspond to a smartphone, a mobile phone, a handheld device, a smart key, a computer, a personal digital assistant, tablet computer, etc.

The method 10 comprises logging 11 into the user account of an administrative platform for vehicles. For example, an OEM may provide vehicle owners access to an OEM platform, which is used to administer vehicles and to exchange information with the user, e.g. which allows a user to make personalized settings or configurations at the vehicle, and/or to retrieve information from or about the vehicle, such as location, status, etc. Another offered functionality may be to let the user execute functions at the vehicle, such as opening of doors, windows, trunk, activate park heating, etc. The logging 11 into the user account may comprise identifying the user, i.e. by a dedicated user identification, and a password or other secret provided by the user, the smart device of the user, respectively.

The method 10 further comprises receiving 12 information on the digital key stored on the smart device. Such a digital key may be pre-stored or pre-determined, it may have been received before or after the above logging 11 into the user account of the administrative platform. For example, the digital key may be generated as a master key or owner key during manufacturing or during the selling procedure of a vehicle and is then associated with the vehicle. An owner of such a key may generate further digital keys, for example, to allow further users access to the vehicle. For example, the key may be provided by an owner, e.g. via another smart device or via the administrative platform. In other embodiments, e.g. in embodiments in relation to car sharing or car rental, the key may be generated and provided by the administrative platform and stored at the respective user's smart device. Hence, at least in some embodiments the key may be received from the administrative platform. The method 10 may further comprise storing the information on the digital key on the smart device, e.g. in embodiments, in which the information on the digital key is received just in time.

In embodiments such storing of the digital key may be carried out in a secured way. For example, the information on the digital key is stored using a secure application of the smart device. Such secure application may correspond to a wallet, a safe or a security container for storing critical information at the smart device, e.g. in an encrypted way with a strict access/rights management policy. Moreover, in some further embodiments the method may comprise granting access to the digital key stored by the secure application to the application for processing vehicle information. That way, the digital key is secured and might not be accessible by any application but only by one or more authorized applications. Such authorization may be carried out by an operating system of the smart device and it may be based on information provided with the digital key, information provided with the application, and/or information generated dynamically by the operating system and the application.

As further shown in FIG. 1 the method 10 further comprises informing 13 an application for processing vehicle information about the information on the digital key. In embodiments such application may be an OEM's application, which is designed to interact with an application on the administrative platform. For example, such application may be installed on the smart device of the user, which may happen before or after reception of the digital key. The method 10 further comprises generating 14 a user account attestation comprising a signature based on the digital key. For example, the user account attestation is a message comprising information related to the user account, e.g. an account identification, and a digital signature, enabling the receiver of the message to verify the message's origin. Moreover, the generating 14 of the user account attestation may be carried out in the background or only upon explicit user confirmation, for example, depending on regional legal requirements. Furthermore, the account identification might not just be an identification (ID) but may also comprise a trustworthy proof that it is this user. This may be a token signed by the backend, which may be received after logging in with username and password.

The method 10 further comprises forwarding 15 the user account attestation to the administrative platform for binding the user account with the digital key. The binding of the user account with the digital key corresponds, for example, to a link or association assigning the digital key to the user account or vice versa. That way, the binding is information indicating that the user account and the digital key (therewith potentially the vehicle) are linked, coupled or connected.

FIG. 2 shows a block diagram of a method 20 for an administrative platform for vehicles and for binding a user account with a digital key. FIG. 2 illustrates the method 20 from the perspective of the administrative platform, e.g. from the perspective of an administrative application executed on the administrative platform. The method 20 comprises operating 21 the administrative platform for vehicles. For example, such an administrative platform may be provided or operated by OEM's or fleet management companies. The method 20 further comprises logging 22 a user into the user account of the administrative platform via a smart device of the user.

As outlined above, there may be embodiments in which the administrative platform provides the information on the digital key to the smart device, potentially even in advance.

The method 20 may then comprise transmitting information on the digital key to the smart device of the user.

As shown in FIG. 2 the method 20 further comprises receiving 23 a user account attestation comprising a signature from the smart device of the user. This is in line with the generating 14 and forwarding 15 of the user account attestation on the smart device's side. The method 20 then comprises verifying 24 that the user account attestation is signed based on the digital key to obtain a verified user account attestation. Such verification can be based on a check of an authenticity of the message based on the signature. For example, such verification can be based on a cryptographic method or function to assure that the sender of such a message was in possession of a digital key associated with the signature of the message. It may also be checked that the user account information is valid, e.g. by checking an authentication token. The method 20 also comprises storing 25 information on the account binding of the user account and the digital key based on the verified user account attestation. At least in some embodiments the method 20 further comprises using a private key of a pair of the private key and a public key as the digital key. For example, the digital key may be generated as private key of a pair of said private key and an associated public key. With such a key pair several cryptographic operations are conceivable in embodiments. For example, the private key can be used to add or generate a signature to a message. The signature can then be verified using the associated public key.

In further embodiments the method 20 may comprise transmitting the information on the account binding to a vehicle associated with the digital key and/or back to the application on the smart device. That way, the vehicle can be made aware of the account binding and enable one or more functions or services for this user. The application on the smart device may therewith be aware of the validated binding. Furthermore, the method 20 may comprise transmitting information on personalized user settings and/or services for the user to the vehicle. This enables a personalized setup of the vehicle even when the user enters the vehicle for the first time. The personalized settings, configurations, or services may include a seat adjustment, a light setting in the cabin, a preset radio station, a preconfigured key assignment, a personalized welcome message, etc.

Figure 3:
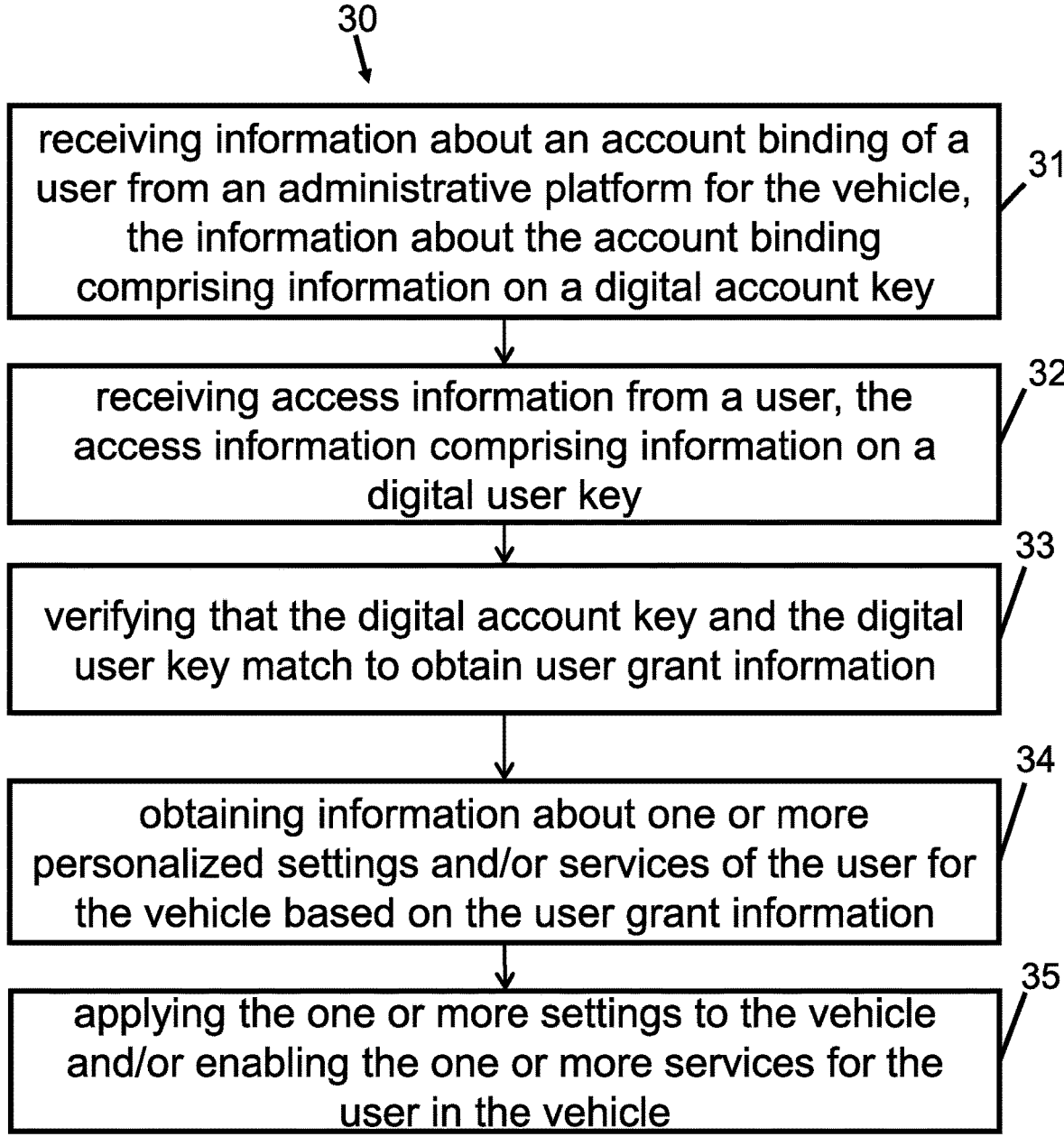
FIG. 3 shows a block diagram of a method for a vehicle and for binding a user account with a digital key.

FIG. 3 shows a block diagram of a method 30 for a vehicle and for binding a user account with a digital key. In embodiments the vehicle may correspond to any means of transportation, such as a car, a van, a truck, a bike, etc. The method 30 shown in FIG. 3 comprises receiving 31 information about an account binding of a user from an administrative platform for the vehicle. The information about the account binding comprises information on a digital account key. The method 30 further comprises receiving 32 access information from a user (or smart device of a user). The access information comprises information on a digital user key. The method 30 further comprises verifying 33 that the digital account key and the digital user key match to obtain user grant information. The method 30 comprises obtaining 34 information about one or more personalized settings and/or services of the user for the vehicle based on the user grant information and applying 35 the one or more settings to the vehicle and/or enabling the one or more services for the user in the vehicle. Therewith, a new user may find personalized settings and services in place at the vehicle, even upon first usage of the vehicle.

In some embodiments the method 30 further comprises granting access to the vehicle based on the grant information. For example, the doors of the vehicle may open and the user may be enabled to start the engine of the vehicle after authorization based on the digital key.

Figure 4:
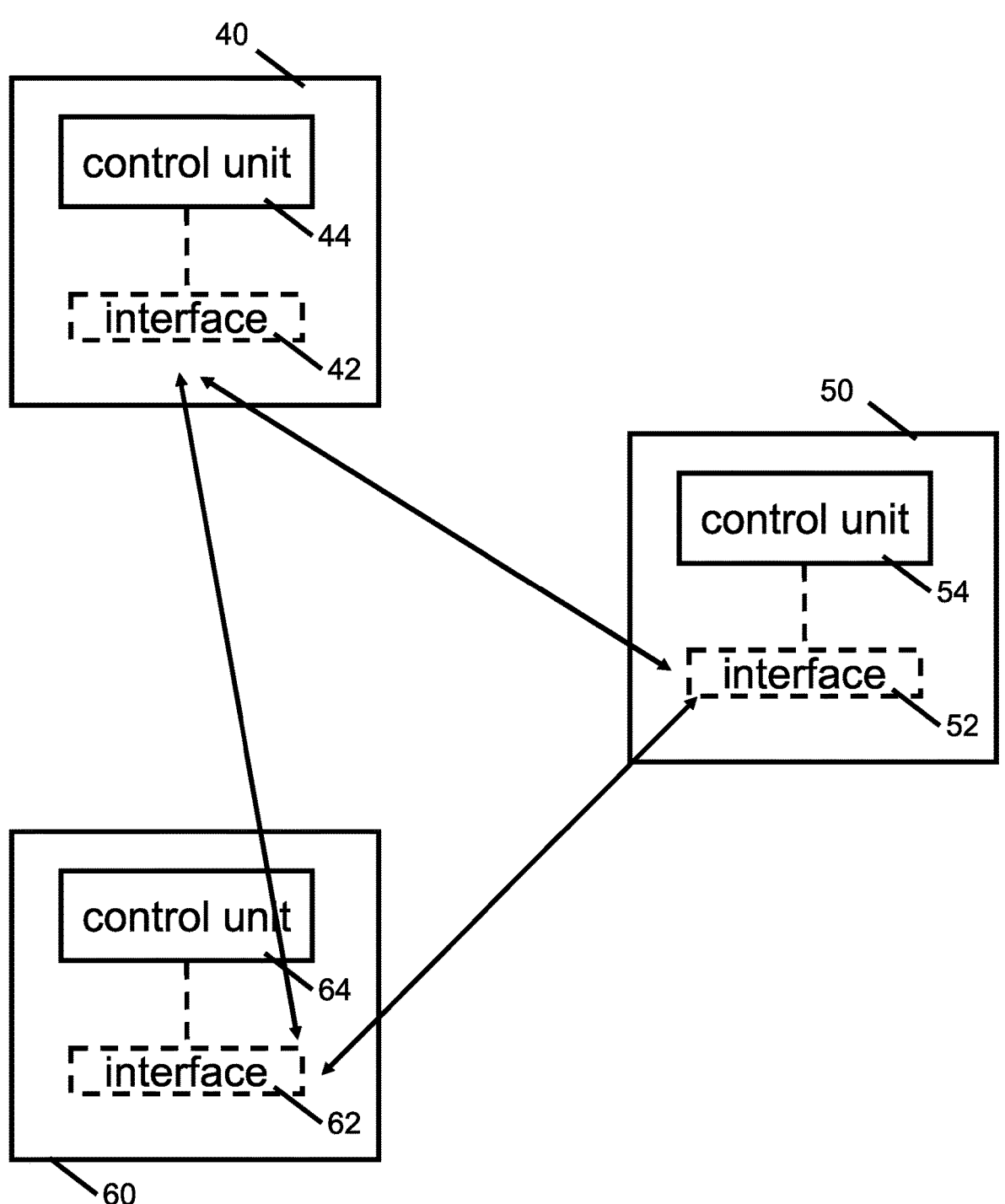
FIG. 4 shows block diagrams of embodiments of apparatuses for a smart device, an administrative application, and a vehicle.

FIG. 4 shows block diagrams of embodiments of apparatuses 40, 50 and 60 for a smart device, an administrative application, and a vehicle. FIG. 4 shows an apparatus 40 for a smart device comprising a control unit 44 for performing one of the methods for the smart device as described herein. FIG. 4 further shows an apparatus 50 for an administrative application for vehicles comprising a control unit 54 for performing one of the methods for the administrative platform as described herein. Yet another embodiment shown in FIG. 4 is an apparatus 60 for a vehicle comprising a control unit 64 for performing one of the methods for the vehicle as described herein.

As further illustrated in FIG. 4 the respective apparatuses 40, 50, 60 may comprise one or more interfaces 42, 52, 62, which are coupled to the respective control units 44, 54, 64. The one or more interfaces 42, 52, 62 may correspond to one or more inputs and/or outputs for receiving and/or transmitting information, which may be in digital (bit) values according to a specified code, within a module, between modules or between modules of different entities. For example, an interface 42, 52, 62 may comprise interface circuitry configured to receive and/or transmit information. In embodiments an interface 42, 52, 62, may correspond to any means for obtaining, receiving, transmitting or providing analog or digital signals or information, e.g. any connector, contact, pin, register, input port, output port, conductor, lane, etc., which allows providing or obtaining a signal or information. An interface 42, 52, 62 may be configured to communicate (transmit, receive, or both) in a wireless or wireline manner and it may be configured to communicate, i.e. transmit and/or receive signals, information with further internal or external components. The one or more interfaces 42, 52, 62 may comprise further components to enable communication in a mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc.

The control units 44, 54, 64 (which may also be referred to herein as simply a "controller" or "controllers") may be implemented using one or more processing units, one or more processing devices, any means for processing, such as a processor, a computer or a programmable hardware component being operable with accordingly adapted software. In other words, the described function of the control/processing unit 44, 54, 64 may as well be implemented in software, which is then executed on one or more programmable hardware components. Such hardware components may comprise a general-purpose processor, a Digital Signal Processor (DSP), a microcontroller, etc. Additional examples of control units used in vehicles include any of various Engine Control Units (ECNs) and related devices which and commonly used by different manufacturers in modern automobiles.

Figure 5:
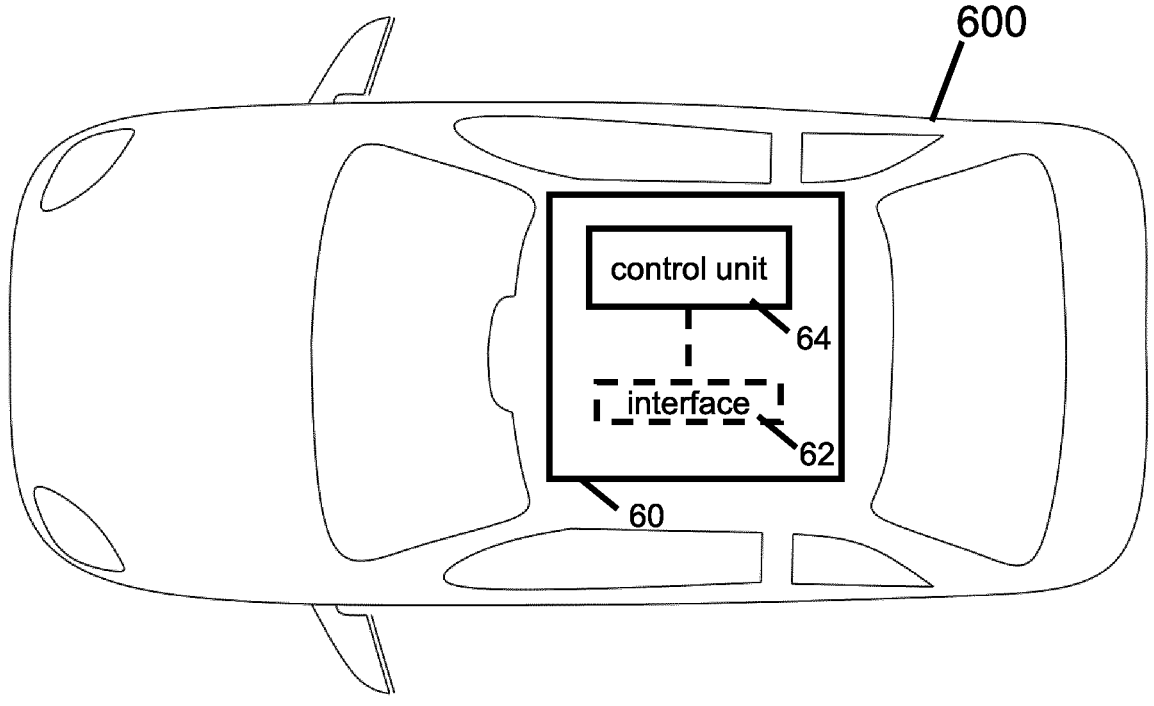
FIG. 5 shows an embodiment of a vehicle.

FIG. 5 shows an embodiment of a vehicle 600, which comprises an embodiment of the apparatus 60. Embodiments may leverage a vehicle OEM user account login in the vehicle OEM app on the smartphone, interfaces in the smartphone operating system and vehicle OEM backend systems to a) offer association of a digital key embedded in the smartphone's secure storage with the vehicle OEM user account ("account binding"), and b) secure the account binding using a cryptographic signature requested by the vehicle OEM app, performed with the digital key on the smartphone, and checked in the vehicle OEM backend.

At least some embodiments may perform the steps mentioned above at the moment of deploying the digital key on a smart device by notifying the vehicle OEM app about the deployment of a digital key on the smart device (even if currently not active on the device).

For example, a user has a smart device, runs the vehicle OEM app and is logged into the vehicle OEM user account. The user receives a digital key on his phone and accepts installation in a secure/wallet application on the smartphone. The vehicle OEM app may be notified of the installation of the digital key and the vehicle OEM app generates a "user account attestation" (data blob containing user account identification (ID) and login token) with cryptographic signature of the digital key. Additionally or alternatively, a request on which digital kays are available and/or the generation of the "user account attestation" may be triggered when the OEM app is started or when it is moved to the foreground of the smart device's display. The vehicle OEM app then forwards user account attestation to vehicle OEM backend and the OEM app in the backend validates cryptographic signature (using digital key/public key known through key tracking-cf. CCC) and the account login token. The vehicle OEM backend may then forward the account binding to the vehicle OEM app and the vehicle using telematics. On the first use of the car with the digital key, the account binding is known to the car and personalized settings and services are available for the user without the need to explicitly log into the car or associate the digital key to the user's account.

As already mentioned, in embodiments the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a (non-transitory) computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim. It is further to be noted that methods disclosed in the specification or in the claims may be implemented by a device having means for performing each of the respective steps of these methods.

REFERENCES 10 method for a smart device of a user and for binding a user account with a digital key
11 logging into the user account of an administrative platform for vehicles
12 receiving information on the digital key stored on the smart device
13 informing an application for processing vehicle information about the information on the digital key
14 generating a user account attestation comprising a signature based on the digital key

15 forwarding the user account attestation to the administrative platform for binding the user account with the digital key 20 method for an administrative platform for vehicles and for binding a user account with a digital key 21 operating the administrative platform for vehicles 22 logging a user into the user account of the administrative platform via a smart device of the user 23 receiving a user account attestation comprising a signature from the smart device of the user 24 verifying that the user account attestation is signed based on the digital key to obtain a verified user account attestation 25 storing information on the account binding of the user account and the digital key based on the verified user account attestation 30 method for a vehicle and for binding a user account with a digital key 31 receiving information about an account binding of a user from an administrative platform for the vehicle, the information about the account binding comprising information on a digital account key 32 receiving access information from a user, the access information comprising information on a digital user key 33 verifying that the digital account key and the digital user key match to obtain user grant information 34 obtaining information about one or more personalized settings and/or services of the user for the vehicle based on the user grant information 35 applying the one or more settings to the vehicle and/or enabling the one or more services for the user in the vehicle 40 apparatus for a smart device 42 one or more interfaces 44 control unit 50 apparatus for an administrative application for vehicles 52 one or more interfaces 54 control unit 60 apparatus for a vehicle 62 one or more interfaces 64 control unit 600 vehicle

The invention claimed is:

1. A method for a smart device of a user and for binding a user account with a digital key, the method comprising:
   logging into the user account of an administrative platform for vehicles;
   receiving information on the digital key stored on the smart device;
   informing an application for processing vehicle information about the information on the digital key;
   generating a user account attestation comprising a signature based on the digital key;
   forwarding the user account attestation to the administrative platform for binding the user account with the digital key;
   binding the user account with the digital key at the administrative platform;
   transmitting the information on the account binding to a vehicle associated with the digital key; and
   based on the binding of the user account with the digital key, transmitting information on personalized user settings or services for the user from the administrative platform to the vehicle.

2. The method of claim 1, wherein the digital key is stored using a secure application of the smart device.

3. The method of claim 2, further comprising granting access to the digital key stored by the secure application to the application for processing vehicle information.

4. The method of claim 1 wherein the smart device is a smartphone and the method is performed by a controller of the smartphone.

5. The method of claim 1 wherein binding the user account with the digital key comprises explicitly linking the user account and the digital key inside the vehicle through a human machine interface.

6. The method of claim 1 wherein the human machine interface is a touchscreen display inside the vehicle.

7. A method for an administrative platform for vehicles and for binding a user account with a digital key, the method comprising:
   operating the administrative platform for vehicles;
   logging a user into the user account of the administrative platform via a smart device of the user;
   receiving a user account attestation comprising a signature from the smart device of the user;
   verifying that the user account attestation is signed based on the digital key to obtain a verified user account attestation;
   storing information on the account binding of the user account and the digital key based on the verified user account attestation;
   transmitting the information on the account binding from the administrative platform to a vehicle associated with the digital key; and
   transmitting information on personalized user settings or services for the user from the administrative platform to the vehicle.

8. The method of claim 7, further comprising using a private key of a pair of the private key and a public key as the digital key.

9. The method of claim 8, wherein the verifying is based on the public key.

10. The method of claim 7 further comprising applying the personalized user settings or services to the vehicle.

11. The method of claim 10 wherein applying the personalized user settings or services for the user of the vehicle comprises at least one of making a seat adjustment to the vehicle, applying a light setting in a cabin of the vehicle, applying a preset radio station to an audio source of the vehicle, applying a preconfigured key assignment to the vehicle, applying a personalized welcome message to a vehicle display.

12. The method of claim 7 wherein the smart device is a smartphone.

13. The method of claim 7 wherein the method is performed by a controller that is separate from the smart device and a vehicle.

14. A method for a vehicle and for binding a user account with a digital key, the method comprising:
   receiving information about an account binding of a user from an administrative platform for the vehicle, the information about the account binding comprising information on a digital account key;
   receiving access information from a user, the access information comprising information on a digital user key;
   verifying that the digital account key and the digital user key match to obtain user grant information;
   obtaining information about one or more personalized settings or services of the user for the vehicle based on the user grant information, and applying the one or more settings to the vehicle or enabling the one or more services for the user in the vehicle.

15. The method of claim 14, further comprising granting access for the user to the vehicle based on the grant information.

16. The method of claim 14 wherein the method is performed by a controller of the vehicle.

17. The method of claim 14 wherein applying the one or more settings to the vehicle comprises at least one of making a seat adjustment to the vehicle, applying a light setting in a cabin of the vehicle, applying a preset radio station to an audio source of the vehicle, applying a preconfigured key assignment to the vehicle, applying a personalized welcome message to a vehicle display.

18. The method of claim 14, wherein the information about one or more personalized settings or services of the user for the vehicle is obtained from the administrative platform after verifying that the digital account key and the digital user key match.

19. The method of claim 14, wherein the information on a digital account key received from the administrative platform for the user includes the information about one or more personalized settings or services of the user, and such information about one or more personalized settings or services of the user is available to the vehicle after obtaining the user grant information.

20. The method of claim 14 wherein the method is performed in association with the user entering the vehicle for a first time.

* * * * *